(12) United States Patent
Gogolla et al.

(10) Patent No.: US 7,023,531 B2
(45) Date of Patent: Apr. 4, 2006

(54) LASER DISTANCE MEASURING DEVICE WITH PHASE DELAY MEASUREMENT

(75) Inventors: Torsten Gogolla, Schellenberg (LI); Andreas Winter, Feldkirch (AT); Helmut Seifert, Serba (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/637,997

(22) Filed: Aug. 8, 2003

(65) Prior Publication Data

US 2004/0105087 A1    Jun. 3, 2004

(30) Foreign Application Priority Data

Aug. 9, 2002 (EP) .................... 02017890

(51) Int. Cl.
*G01C 3/08* (2006.01)

(52) U.S. Cl. ............... 356/5.01; 356/5.11; 356/5.15

(58) Field of Classification Search ........... 356/5.01, 356/5.06, 5.09, 5.1, 5.11, 5.15
See application file for complete search history.

(56) References Cited

U.S. PATENT DOCUMENTS

| | | | | |
|---|---|---|---|---|
| 3,778,159 A | * | 12/1973 | Hines et al. | 356/5.11 |
| 4,093,380 A | * | 6/1978 | White | 356/5.11 |
| 4,229,102 A | * | 10/1980 | Wiklund et al. | 356/5.12 |
| 4,403,857 A | * | 9/1983 | Holscher | 356/5.13 |
| 4,600,299 A | * | 7/1986 | Abshire | 356/5.15 |
| 4,957,362 A | * | 9/1990 | Peterson | 356/5.14 |
| 5,125,736 A | * | 6/1992 | Vaninetti et al. | 356/5.1 |
| 5,162,862 A | * | 11/1992 | Bartram et al. | 356/5.15 |
| 5,940,170 A | * | 8/1999 | Berg et al. | 356/5.1 |
| 6,100,540 A | * | 8/2000 | Ducharme et al. | 250/559.38 |
| 6,369,880 B1 | * | 4/2002 | Steinlechner | 356/5.11 |
| 6,463,393 B1 | * | 10/2002 | Giger | 702/97 |
| 6,483,595 B1 | * | 11/2002 | Yakovlev et al. | 356/607 |
| 6,509,958 B1 | * | 1/2003 | Pierenkemper | 356/5.01 |

* cited by examiner

*Primary Examiner*—Thomas H. Tarcza
*Assistant Examiner*—Isam Alsomiri
(74) *Attorney, Agent, or Firm*—Abelman, Frayne & Schwalbe

(57) ABSTRACT

A laser distance measuring device (1) includes a laser diode (4) for emitting a high frequency intensity modulated measurement light beam (3) and connected with a signal generating unit (SGU) that generates a high frequency measurement signal (9) for high frequency signal transfer, at least one receiver photodetector (8a) for receiving a measurement light beam (3) reflected from a measurement object (5) and connected to a high frequency demodulator (13) for generating a low frequency phase delay signal ($S_1$) containing phase information of the reflected intensity modulated measurement light beam (3), and a microcontroller (μC) for calculating a distance (D) from the phase delay signal ($S_1$) and connected to the high frequency demodulator (13), with the microcontroller (μC) being connected to a control photodetector (8c) arranged in the measurement light beam (3) for low frequency transfer for determining an interference modulation component.

11 Claims, 5 Drawing Sheets

LASER DISTANCE MEASURING DEVICE WITH PHASE DELAY MEASUREMENT

BACKGROUND OF THE INVENTION

1. Field of the Invention

The invention relates to an opto-electronic distance measuring device with an intensity modulated measurement light beam based on the principle of phase delay measurement

2. Description of the Prior Art

Such opto-electronic distance measuring devices are suitable for measurement on technical surfaces, that is, they can be used without the use of defined targets. For determining the distance from a laser diode to an object being measured and from the object to the photodiode, an intensity of a measurement light beam of the laser diode is, as a rule, modulated, i.e., a measurement signal with a high measurement frequency heterodynes the measurement light beam. A phase delay process, in which a periodic, intensity-modulated emitted laser radiation is used, is now used in the majority of the current precise opto-electronic distance measuring devices. The distance is obtained from the measurement of the phase difference relative to two detected periodic phase delay signals along the measurement path or a reference path, which is retained even after downmixing to a lower intermediate frequency. The measurement of distance ranges up to several 100s of meters with precisions of a few millimeters is of considerable importance to numerous applications, in particular in the construction industry, trades and in plant engineering. In this range of requirements with highly precise measurements in a wide range of distances, the elimination or suppression of sources of measurement errors in opto-electronic distance measurement is necessary, especially the suppression of interfering low and high frequency interference modulations in the measurement light beam. Particularly in the case of very high measurement frequencies $f_M$ of 1 GHz, for example, the described interference modulation components cannot be avoided or can be avoided only at great expense. In addition, the interference modulation components are dependent on and aging, so that an initial calibration and the use of correction tables for troubleshooting is inadequate.

According to DE 10006493, several different measurement frequencies are used, in real situations more than two, with high measurement frequencies of, for example, 1 GHz, for the clear determination of distance ranges greater than 100 m, for example.

EP 601847B1 discloses a laser distance measuring device based on linear laser light frequency modulation (laser frequency chip), wherein for elimination of non-linearities by photonic mixing of laser chip signals using a laser local oscillator signal, an electrical control signal is generated, which oscillates with a frequency difference between both laser signals. Using control signals from a microcontroller, a side band is suppressed by means of quadriphase modulation in the spectrum of the electrical control signal. In addition, the microcontroller is used for generating a correction signal in order to compensate in advance measured non-linearities in the laser frequency chip, and for generation of a temporarily stored tracking/hold signal in order to keep a measured error signal close to zero.

According to EP 439011, the laser diodes are modulated sequentially using four phase shifted high frequency oscillator signals offset by 90 degrees. In a receiver, the respective reception signals are multiplied by the correspondingly sent oscillator signals, whereby four identical signals are generated. Using this system comprised of four equations, the interference direct components and signal amplitudes can be eliminated, and the phase shift or the signal delay and, thus, the distance can be determined. An approximation filter disposed downstream of the receiver is controlled by the microcontroller relative to bandwidth. In addition, using the driving circuit of the transmitter, the laser diode current and, accordingly, the emitted light output is controlled. For the purpose of regulating the light output via the d.c. operating point of the laser diode, the laser diode has a monitor photodiode in its housing, using which the mean output light power of the laser diode is measured and controlled by an analog PI regulator. Control of the d.c. operating point of the laser diode or of the approximation filter is not appropriate for purposes of interference suppression.

The object of the invention is to provide a device and a method for reducing the measurement errors occurring due to interference modulation components in the measurement light beam of an opto-electronic distance measuring device.

SUMMARY OF THE INVENTION

This and other objects of the present invention, which will become apparent hereinafter, are achieved by a laser distance measuring device essentially having a laser diode associated with a signal generation unit for generating a high frequency measurement signal and a high frequency mixer signal for emitting a high frequency intensity-modulated measurement light beam, a high frequency demodulator appropriately connected to a receiving photodetector for receiving the measurement light beam reflected from a measurement object for high frequency signal transfer for generating a low frequency phase delay signal, which contains phase information of the reflected intensity modulated measurement light signal, and a microcontroller connected to the high frequency modulator for calculating of a distance from the phase delay signal and suitably connected to a control photodetector, which is arranged in the path of the measurement light beam exclusively for the purpose of low frequency transmission.

With the microcontroller which is suitably connected, either directly or indirectly via an amplifier with a control photodetector arranged in the measurement light beam and which can be configured with a double function as an additional photodetector and as a receiving photodetector, exclusively for the purpose of low frequency transmission, the low frequency modulation components of the measurement light beam, which indicate interference modulation, are applied directly to the microcontroller for further processing in terms of values. Accordingly, the microcontroller, which is suitably connected exclusively for low frequency transmission, insures that only those signals are transferred, whose frequency is essentially lower, for example, lower than one one-thousandth than the modulation frequency of the measurement light beam.

Advantageously, the control photodetector is configured as a monitor photodiode integrated in the laser diode, which is available as a standard component for power regulation and monitoring and which can be very slow with regard to its transmission characteristics.

Advantageously, a control circuit is configured using the control photodetector, the microcontroller, the signal generation unit, the laser diode, and the measurement light beam, whereby the microcontroller using control processes with control parameters can minimize the interference modulation components of the measurement light beam.

Advantageously, in the case of a signal generation unit being configured as a quadrature modulator, at least one amplitude control means such as a controllable amplifier, a controllable resistor, or a controllable D/A converter that can be controlled by the microcontroller, is arranged between the microcontroller and the signal generation unit, whereby in the case of two necessary low frequency signals for quadrature modulation, the amplitude ratio can be controlled by the microcontroller. Further advantageously, in addition, a phase control means controllable by the microcontroller such as a controllable phase setter is available, whereby additional dyssymmetries between the two low frequency signals relative to the phase relationship required for quadrature modulation can be controlled by the microcontroller. Though these operations, a minimal interference sideband, which represents an interference modulation component, can be controlled.

Advantageously, at least one amplitude control means can be controlled relative to the direct component, whereby in the case of at least one of the low frequency signals of the direct component required for quadrature modulation, the direct component can be controlled by the microprocessor and, consequently, a minimal residual carrier, which represents an interference modulation component, can be controlled.

According to the invention, during a measurement operation using a laser distance measuring device, in a first step, at least one low frequency signal is generated, using which in a second step a high frequency mixer signal and a high frequency measurement signal are generated in such a way that a low frequency mixed product between the high frequency mixer signal and the high frequency measurement signal is phase-locked to the low frequency signal generated in the first step, and in a third step, the high frequency measurement signal is determined by a laser diode using its modulated measurement light beam and is reflected by a measurement object located at a distance. In a fourth step, the reflected measurement light beam is received temporally offset by a receiving photodetector, and the temporally offset high frequency measurement signal is demodulated using the high frequency mixer signal. In a fifth step, a phase delay signal produced from the demodulation of the temporally offset high frequency measurement signal is used by a microcontroller for calculating the distance, wherein in the third step, at least the low frequency modulation component of the modulated light beam of the laser diode detected using a control photodetector is communicated to the microcontroller for determination of an interference modulation component in terms of value.

By communicating the low frequency modulation components of the determined measurement light beam, which are indicative of the interference modulation components, to the microcontroller steps can be carried out by the microcontroller for countermeasures.

Advantageously, the third step influences the first step due to a feedback regulated by the microcontroller, whereby the low frequency signal can be modified by the microcontroller for minimizing the influence of interference modulation components, for example, by changing its signal form, phase, and/or amplitude.

Advantageously, in the first step, two low frequency measurement signals phase-offset by 90° are generated which, in the second step, are quadrature modulated to the high frequency signal and the high frequency mixer signal, whereby with the modulation, a single sideband modulation with carrier suppression is primarily realized.

Advantageously, in a quadrature modulation in the second step, at least one low frequency signal is regulated by the microcontroller with respect to its amplitude and/or phase, whereby symmetry differences between the two low frequency signals, which result in residual carrier effective as an interference modulation component and lead to an undesirable sideband, can be regulated out.

Advantageously, in the first step, upon a write command, for example, a count signal or upon shutdown, the actual control parameters are written in a non-volatile memory and, in response to a read commend, upon startup, for example at the time of turning on, the control parameters are initialized with those of the memory, whereby adjustment times are shortened.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
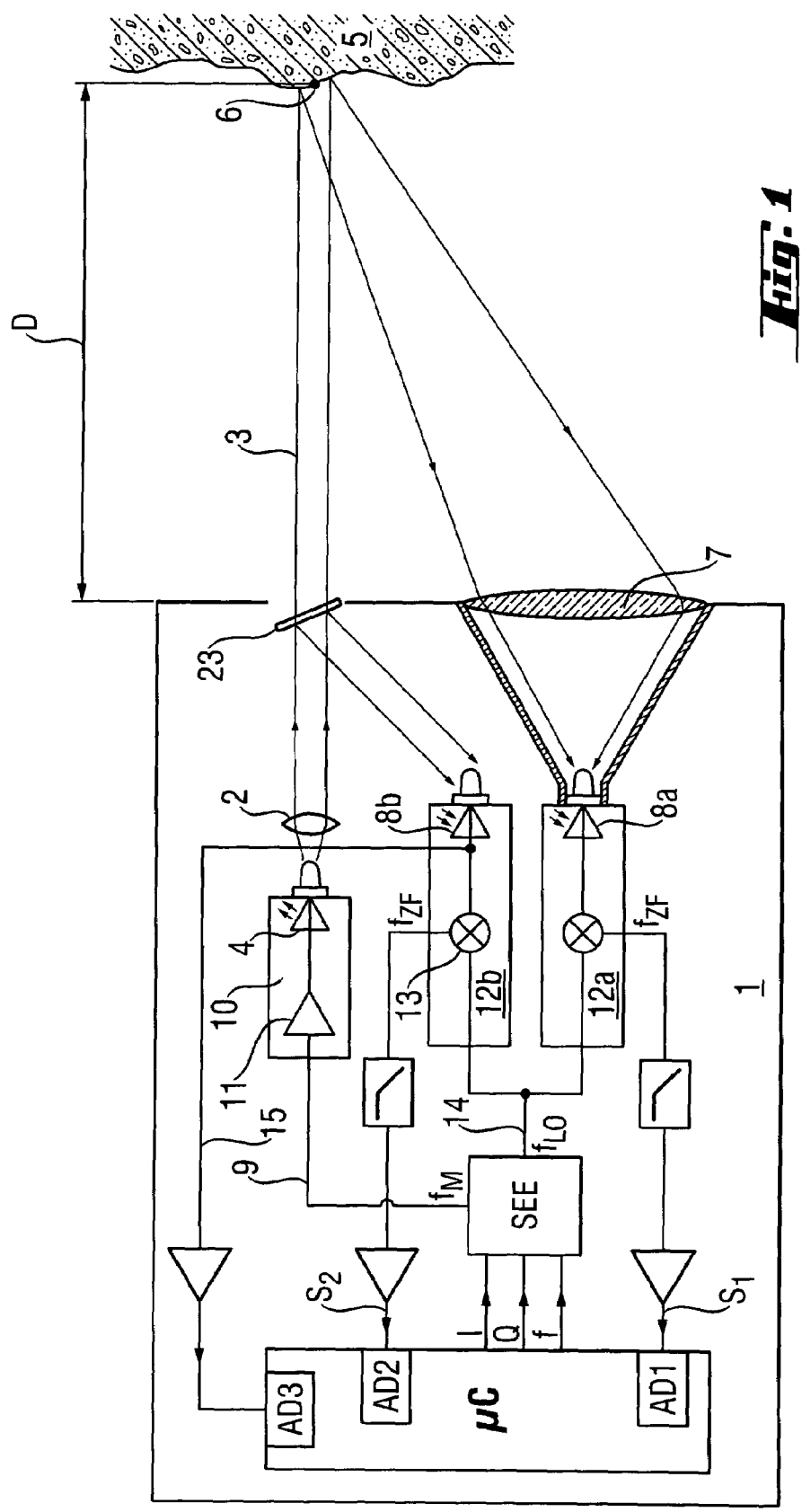
FIG. 1 a diagram representing an opto-electronic distance measuring device according to the present invention.

According to FIG. 1, in an opto-electronic distance measuring device 1, a measurement light beam 3 emitted by a laser diode 4 and bundled by a collimation optic 2 is directed at a measurement object 5. The measurement light beam 3 generates a light point 6 on the surface of the measurement object 5. The scattered light from this light point 6 is focussed using a receiver optics 7 onto a photosensitive surface of a first receiving photodetector 8a configured as a photodiode. For determining the distance D from the distance measuring device 1 to the measurement object 5, a high frequency measurement signal 9 is superimposed on the measurement light beam 3 of the laser diode 4. As a measurement method, a phase delay process is used which is based on a periodic, intensity-modulated emitted laser radiation. Herein, the emitter 10 is impinged upon with the measurement signal 9 of a signal generation unit SEE having the measurement frequency $f_M$, wherein the emitted light output is modulated, using a laser diode driver 11 of the emitter 10, by the laser diode current. The measurement light beam 3 passes back and forth, after its emission, over distance D to be measured and ultimately impinges upon the active surface of the first receiving photodetector 8a or the first receiver 12a and there is converted into an equivalent photo current. For the purpose of phase reference, the measurement light beam 3, after its emission, is guided via a splitter 23 partially over a reference path internal to the device and, depending on its length, onto the active surface of a second receiver photodetector 8b configured as a photodiode of a second receiver 12b, and is there also converted into an equivalent photo current. The photo currents are amplified in the respective receivers 12a, 12b and are mixed, in a high frequency modulator 13 configured as a mixer, with a mixer signal 14 of the mixer frequency $f_{LO}$. The intermediate frequency $f_{ZF}$ corresponds to the frequency difference $[f_M - f_{LO}]$. The mixer frequency $f_{LO}$ of the signal generation unit SEE deviates slightly from the measurement frequency $f_M$ of the measurement signal 9, so that after low pass filtering by the mixing process in the first and second receivers 12a, 12b, first and second low frequency phase delay signals S1 and S2 having an intermediate frequency $f_{ZF}$, are generated. The phase relationship of the high frequency measurement signal 9 and the mixer signal 14 is retained also in the converted low frequency range of the intermediate frequency $f_{ZF}$. After low-pass filtering and suitable amplification the two low frequency phase delay signals S1 and S2 are transmitted in a digitized form via a microcontroller-internal analog-digital-converter AD1, AD2 to a microcontroller μC. The microcontroller μC determines the phase difference between the phase delay signals S1 and S2 and therefrom the measurable distance D. For the detection of the low frequency modulation components of the measurement light beam 3, a converted low frequency receiver photodiode current of the second receiver 2b of second receiver photodiode detector 8b, which is converted upstream of the high frequency demodulator 13, is amplified and fed via a microcontroller-internal analog digital-converter AD3 to the microcontroller μC that controls the signal generation unit SEE using digital modulation signals I, Q, for generating of the measurement signal 9 having the measurement frequency $f_M$, and the mixer signal 14 having the mixer frequency $f_{LO}$ whereby interference modulation components are minimized in the measurement light beam 3.

In a modified (not shown) embodiment, the photodiodes themselves are used as opto-electronic mixers, with the mixer signal 14 being superimposed by the depletion layer voltage of the mixers so that the sensitivity of the photodiodes is modulated according to the mixer signal.

Figure 2:
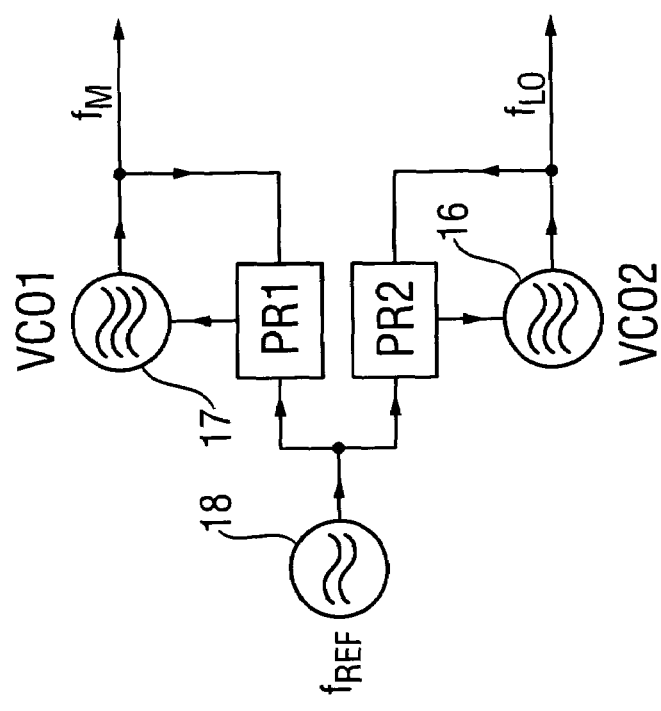
FIG. 2 a diagram representing the signal generation unit.

According to FIG. 2, in accordance with the characteristic of the signal generation unit (SEE), only one high frequency mixer frequency oscillator 16 is used for generating the mixer signal 14 with the mixer frequency $f_{LO}$. By quadrature modulation of this mixer signal 14 with two low frequency, 90° phase-offset, modulation signals I and Q having the intermediate frequency $f_{ZF}$, in a quadrature modulator IQ, a phase-locked measurement signal 9, which deviates in frequency by the intermediate frequency $f_{ZF}$, and which has a measurement frequency $f_M = f_{LO} - f_{ZF}$, is generated. Accordingly, on the one hand, the low frequency modulation signal I $$I = A \cdot \sin(2 \cdot \pi \cdot f_{ZF} \cdot t) \quad (1)$$

is multiplied by the mixer signal 14 of the mixer frequency $f_{LO}$ $$Y_{0°} = B \cdot \sin(2 \cdot \pi \cdot f_{ZF} \cdot t) \quad (2)$$

and, on the other hand, the low frequency modulation signal Q $$Q = A \cdot \cos(2 \cdot \pi \cdot f_{ZF} \cdot t) \quad (3)$$

is multiplied by the 90° phase-offset mixer signal 14 having mixer frequency $f_{LO}$ $$Y_{90°} = B \cdot \cos(2 \cdot \pi \cdot f_{LO} \cdot t) \quad (4)$$

The two mixed products $$Y_{0°} \cdot I = C \cdot \cos(2 \cdot \pi \cdot (f_{LO} - f_{ZF}) \cdot t) + C \cdot \cos(2 \cdot \pi \cdot (f_{LO} + f_{ZF}) \cdot t) \quad (5)$$

and $$Y_{90°} \cdot Q = C \cdot \cos(2 \cdot \pi \cdot (f_{LO} - f_{ZF}) \cdot t) + C \cdot \cos(2 \cdot \pi \cdot (f_{LO} + f_{ZF}) \cdot t) \quad (6)$$

are then summed. Under ideal conditions, that is, with equal amplitudes C of the mixed products, at identical phase of the desired sideband with the frequency $f_{LO} - f_{ZF}$, at a counter-phase of the undesired sideband with the frequency $f_{LO} + f_{ZF}$, and with modulation signals I, Q without direct component, the sideband with the frequency $f_{LO} + f_{ZF}$ and the carrier with the high frequency $f_{LO}$ are precisely suppressed. The summed signal then is:

$$Z_U = 2 \cdot C \cdot \cos(2 \cdot \pi \cdot (f_{LO} - f_{ZF}) \cdot t) = D_U \cdot \cos(2 \cdot \pi \cdot f_M). \quad (7)$$

In the actual case, the conditions regarding amplitudes, phases, and the direct component are not given due to parasite effects. A residual component of the undesired sideband and the carrier remain present. The measurement light beam 3 accordingly is modulated, on one hand, with the measurement signal 9, $$Z_U = D_U \cdot \cos(2 \cdot \pi \cdot (f_{LO} - f_{ZF}) \cdot t). \quad (8)$$

with the measurement frequency $f_M = f_{LO} - f_{ZF}$ of the lower desired sideband and, on the other hand, with the interference signal $$Z_O = D_O \cdot \cos(2 \cdot \pi \cdot (f_{LO} - f_{ZF}) \cdot t). \quad (9)$$

having the frequency $f_{LO} + f_{ZF}$ of the upper undesired sideband and with the interference signal $$Z_T = D_T \cdot \cos(2 \cdot \pi \cdot f_{LO} \cdot t) \quad (10)$$

with the high frequency $f_{LO}$ of the carrier.

Because of a non-linear behavior of the laser diode 4, along with the high frequency modulation components having the frequencies $f_M = f_{LO} - f_{ZF}$, $f_{LO} + f_{ZF}$ and $f_{LO}$, their low frequency mixed products having the frequencies $f_{ZF}$ and $2 \cdot f_{ZF}$ emerge in the measurement light beam 3.

Accordingly, essentially the following modulation components are present in the measurement light beam 3, of which some are several useful signals or interference signals

| Modulation Component | Frequency | Optical Power | Intermediate Frequency Amplitude | |
|---|---|---|---|---|
| M1 | $f_M = f_{LO} - f_{ZF}$ | P1 | $A_{ZF1}$ | Useful signal |
| M2 | $f_M = 2 \cdot f_{ZF} = f_{LO} + f_{ZF}$ | P2 | $A_{ZF2}$ | Interference signal |
| M3 | $f_M + f_{ZF} = f_{LO}$ | P3 | $A_{ZF3}$ | |
| M4 | $f_{ZF}$ | P4 | $A_{ZF4}$ | Interference signal |
| M5 | $2 \cdot f_{ZF}$ | P5 | $A_{ZF5}$ | |

The first modulation component M1 is the useful signal having the light power amplitude P1.

The second and third modulation components M2, M3 emerge from an actual quadrature modulation. The fourth modulation component M4 results from a mixture of the first modulation component M1 with the third modulation component M3 by non-linearities of the laser diode 4 and the fifth modulation component M5 is generated by mixing of the first modulation component M1 with the second modulation component M2. The light power amplitude P1 is generally considerably greater (>30 dB) than the light power amplitudes P2 to P5.

After detection in the receiver, the modulation components of the measurement light beam 3 are mixed with the mixer signal 14 of the mixer frequency $f_{LO}$. After low-pass filtering, the first modulation component M1 provides the useful signal with the intermediate frequency $f_{ZF}$ and the amplitude $A_{ZF1}$, the second modulation component M2 provides an interference signal with the same intermediate frequency $f_{ZF}$ and the amplitude $A_{ZF2}$, and the third modulation component M3 provides a non-interference direct signal. The low frequency fourth and fifth modulation components M4 and M5 leave the receiver unmixed. The fourth modulation component M4 with the intermediate frequency $f_{ZF}$ and the amplitude $A_{ZF4}$ also forms an interference signal. Since the fourth modulation component M4 emerges from the third modulation component M3, the third modulation component M3 also participates indirectly in the measurement error. All modulation components that generate interference signals in the low frequency range having the intermediate frequency $f_{ZF}$ of the useful signal, produce distance measurement errors ΔD, wherein the maximal measurement error of the second and fourth modulation components M2, M4 can be described using $$\Delta D_2 = \frac{A_{ZF2}}{A_{ZF1}} \cdot \frac{c}{4 \cdot \pi \cdot f_M} \text{ and } \Delta D_4 = \frac{A_{ZF4}}{A_{ZF1}} \cdot \frac{c}{4 \cdot \pi \cdot f_M} \quad (11)$$

Where c is the speed of light and $f_M$ is the measurement frequency of the laser diode 4. It is further assumed that the interference signal amplitudes $A_{ZF2}$ and $A_{ZF4}$ are substantially smaller than the useful signal amplitude $A_{ZF1}$. In the case of a suppression of the modulation components M2 or M4 effective as interference signals vis-a-vis the useful signal of, for example, 25 dB, in the case of a measurement frequency of $f_M$=1 GHz with a maximum error of ΔD=±1.3 mm must be presumed.

The measurement frequency $f_M$ and the mixer frequency $F_{LO}$ are offset by the amount of the intermediate frequency $f_{ZF}$. In the above representation, the lower sideband having the measurement frequency $f_M = F_{LO} - f_{ZF}$ is used as the measurement signal 9. The high frequency second and third modulation components M2, M3 effective as interference signals have, in an alternative A, the frequencies $f_M + f_{ZF} = F_{LO}$ and $f_M + 2^*f_{ZF} = f_{LO} + f_{ZF}$. In an alternative B, the upper sideband with a modulation frequency of $f_M = f_{LO} + f_{ZF}$ can also be used as the measurement signal 9, whereby interference modulation components were in the frequencies $f_M - f_{ZF} = f_{LO}$ and $f_M - 2^*f_{ZF} = f_{LO} - f_{ZF}$. In the following table the discrete frequencies of the two alternatives are again recapped.

| Alternative | Measurement Frequency M1 | Interference Frequency M2 | Interference Frequency M3 |
|---|---|---|---|
| A | $f_M = f_{LO} - f_{ZF}$ | $f_M + 2^*f_{ZF} = f_{LO} + f_{ZF}$ | $f_M + f_{ZF} = f_{LO}$ |
| B | $f_M = f_{LO} + f_{ZF}$ | $f_M - 2^*f_{ZF} = f_{LO} + f_{ZF}$ | $f_M - f_{ZF} = f_{LO}$ |

Figure 3:
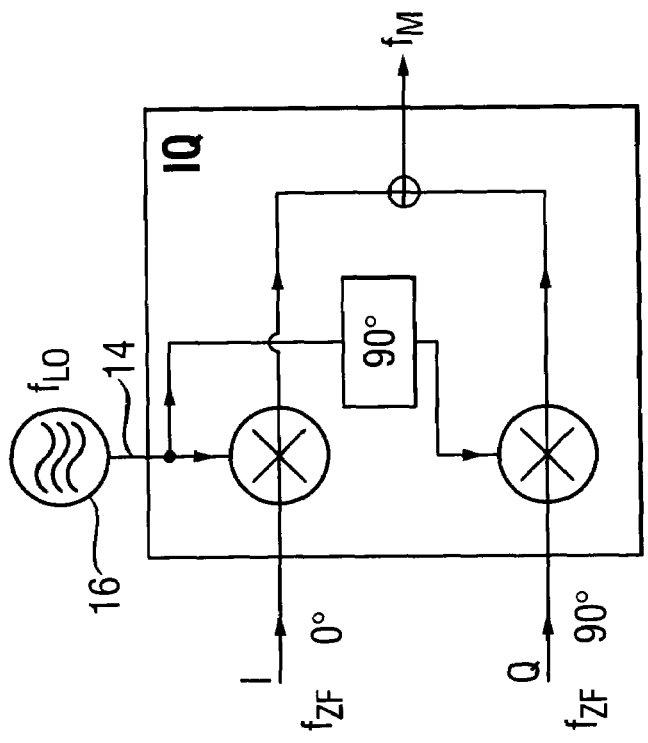
FIG. 3 a diagram representing another embodiment of the signal generation unit.

According to FIG. 3, in one alternative embodiment of the signal generation unit SEE, two separate, control voltage-dependent oscillators VCO1, VCO2 are used as a mixed frequency oscillator 16 with the mixer frequency $f_{LO}$ and as a measurement oscillator 17 having the frequency $f_M$, which are coupled frequency-and phase-locked with a low frequency reference oscillator 18 by phase control loops PR1, PR2, respectively. The intermediate frequency $f_{ZF}$ corresponds to the frequency difference between the two high frequency signals. Accordingly, the measurement light beam 3 along with the measurement signal 9 is modulated with the measurement frequency $f_M$ additionally with the interference modulation components generated, due to the phase regulations in the measurement oscillator 17, with comparatively minimal power and the frequencies $f_M \pm n^*f_{ZF}$ with n=1, 2, 3. . . .

The modulation components M2 to M5 acting as interference modulation components are, thus, present both in the signal generation using two VCOs and phase control circuits according to FIG. 3 and also in the signal generation with the quadrature modulation according to FIG. 2. As described above, the interference high frequency second and third modulation components M2 and M3 produce in the measurement light beam 3, due to non-linear properties of the laser diode 4, low frequency fourth and fifth modulation components M4 and M5 with the intermediate frequency $f_{ZF}$ and the double intermediate frequency $2^*f_{ZF}$.

Figure 4:
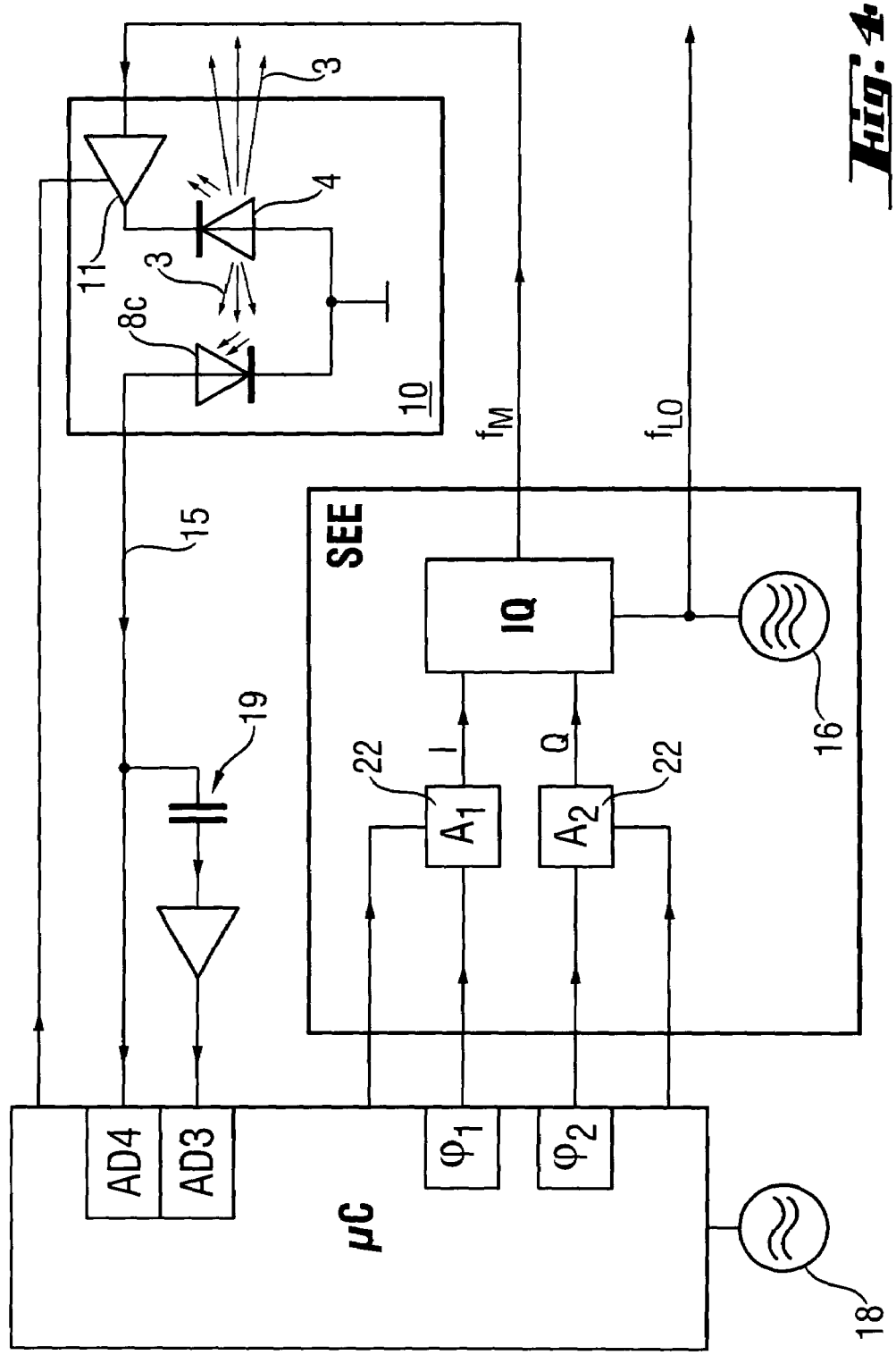
FIG. 4 a detail of the control circuit of the measuring device according to the present invention.

In the control circuit according to FIG. 4, in which only a portion of the control circuit with the microcontroller μC, the transmitter 10, and the signal generation unit SEE is shown, the low frequency modulation components in the measurement light beam 3 are received using a control photodetector 8c configured as a monitor photodiode of the laser diode 4, wherein a small part of the modulated measurement light beam 3 is directed onto the active surface of this, relative to transfer behavior, slow monitor photodiode, which nevertheless is incorporated in the laser diode housing for regulation of the output light power. The low frequency alternating component of the control signal is decoupled from the direct component by a high-pass filter 19, is amplified and digitized using the microcontroller-internal analog-digital-converter AD3, and is communicated to the microcontroller μC. The microcontroller μC then determines, from the digitized low frequency alternating component, the two interfering fourth and fifth modulation components M4, M5 with the intermediate frequency $f_{ZF}$ and the double intermediate frequency $2^*f_{ZF}$. The microcontroller μC generates the low frequency digital modulation signals I, Q for quadrature modulation according to FIG. 2. The phases φ1 and φ2 of the two modulation signals I, Q are accordingly adjusted using the timing of the microcontroller μC. The amplitudes A1 and A2 of the two modulation signals I, Q are varied by damping elements 22 controlled by the microcontroller μC. By phase and amplitude adaptation of the I and/or Q modulation signal, the undesired sideband is suppressed, so that the fifth modulation component M5 with the double intermediate frequency $2^*f_{ZF}$ in the control signal 15 and consequently also the undesired side band disappear. With the modulation signals I $$I = A_1 \cdot \sin(2\pi f_{ZF} \cdot t + \phi_1) \quad (12)$$

and Q $$Q = A_2 \cdot \cos(2\pi f_{ZF} \cdot t + \phi_2) \quad (13)$$

the undesired side band of the measurement signal (9) in the actual case has the form $$Z_0 = A_1 \cdot \alpha_1 \cdot \cos(2\pi \cdot (f_{LO} + f_{ZF}) \cdot t + \Theta_1 + \phi_1 - A_2 \cdot \alpha_2 \cdot \cos(2\pi (f_{LO} + f_{ZF}) \cdot t + \Theta_2 + \phi_2), \quad (14)$$

wherein α1 and α2 are unequal constants, which are produced by asymmetries, and Θ1 and Θ2 are corresponding error phases. The undesired side band, that is, the interfering second modulation component or the low frequency fifth modulation component M5 having the double intermediate frequency $2*f_{ZF}$, can be eliminated using the conditions $$\frac{A_1}{A_2} = \frac{\alpha_2}{\alpha_1} \quad (15)$$

and $$\phi_1 - \phi_2 = \Theta_2 - \Theta_1 \quad (16)$$

which can be obtained as a function of the interference component by amplitude and/or phase variations of the modulation signals I, Q by the microcontroller μC. By variation of the direct components of the I and/or Q modulation signals by the microcontroller μC, the interfering fourth modulation component M4 in the control signal 15 with the intermediate frequency $f_{ZF}$ and, accordingly, the carrier can be similarly minimized. The phase, amplitude, and d.c. voltage values of the modulation signals I, Q which are required to achieve this, are stored in a non-volatile memory in the microcontroller μC as control parameters for the next measurement. Before each distance measurement, a control measurement of the low frequency fourth and fifth modulation components M4, M5 and, if required, an adjustment, is carried out. Along with the low frequency alternating component of the control signal separated by using the high-pass filter, the direct component of the control signal is also supplied to the microcontroller μC via a microcontroller-internal analog-digital-converter AD4. The evaluation of the direct component is unimportant for the interference modulation or error reduction. This direct component is decisive for the middle range of output light power of the laser diode 4, which due to vision safety must not exceed 1 mW. The microcontroller μC can thus control and regulate the output power directly via the laser diode driver 11.

Figure 5:
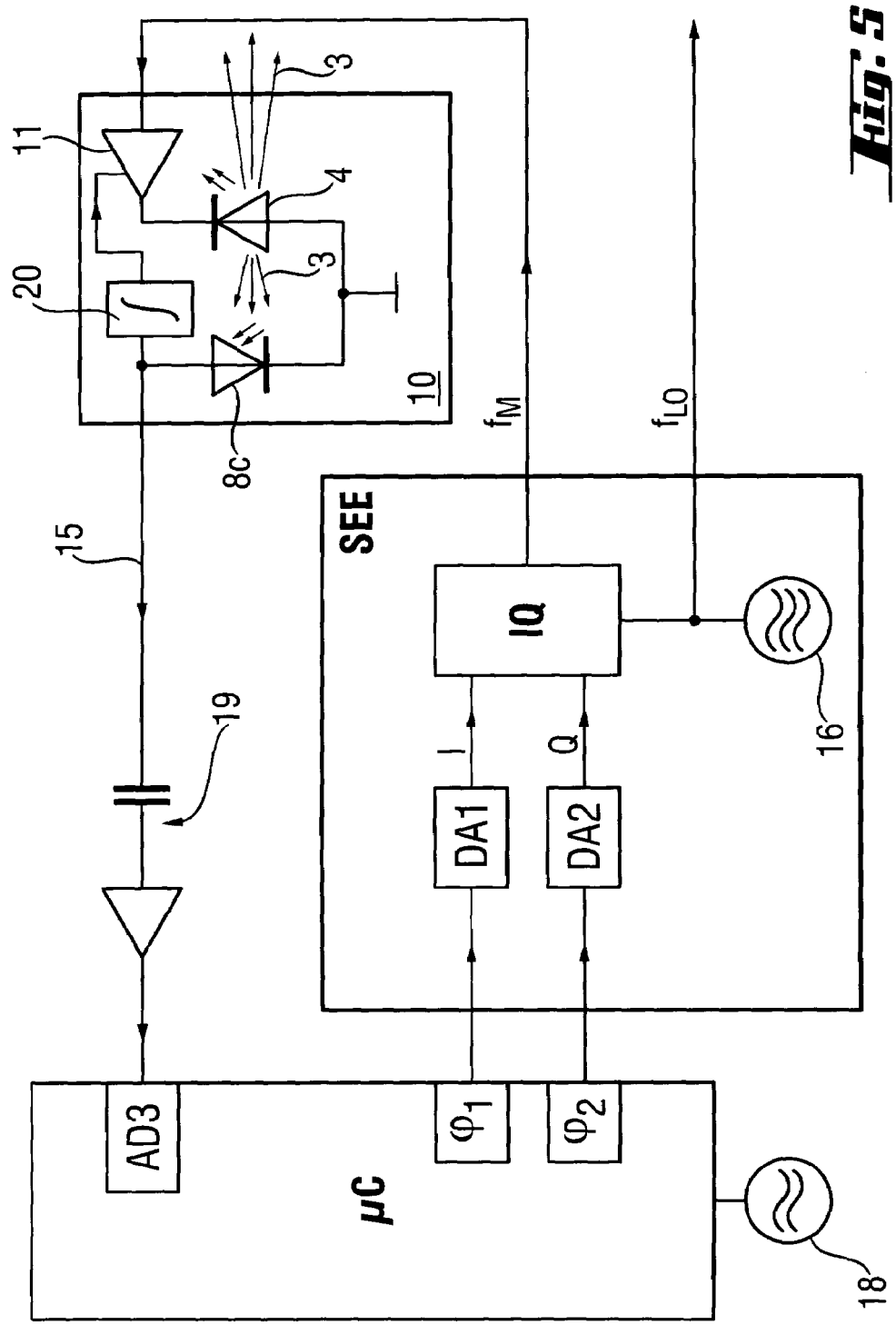
FIG. 5 an alternative embodiment of the control circuit.

FIG. 5 represents an alternative embodiment, in which external digital-analog-converters DA1, DA2 are used for the amplitude adjustment of the digital modulation signals I, Q. The phases φ1 and φ2 are adjusted by being timed using the microcontroller μC. The transmitter 10 contains, in addition to the laser diode 4, the control photodiode 8c that is configured as a monitor photodiode arranged in the path of the measurement light beam 3, a laser diode driver 11 and a PI regulator 20 for laser diode power regulation. Only the low frequency alternating component of the control signal, which is decoupled from the direct component using the high pass filter 19, is amplified, digitized by the microcontroller-internal analog-digital-converter, and supplied to the microcontroller μC.

Figure 6:
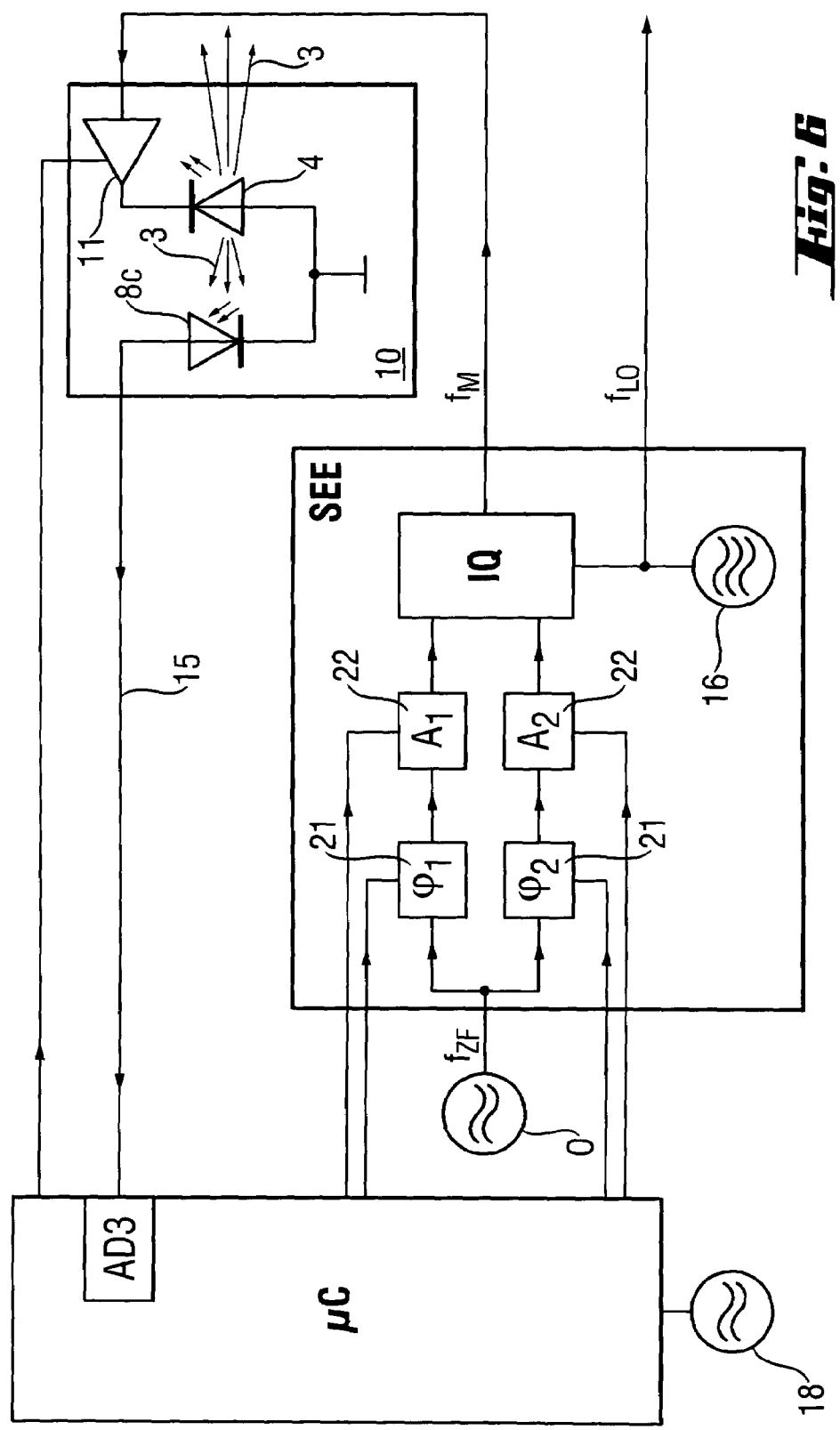
FIG. 6 yet another embodiment of the control circuit.

FIG. 6 represents a further alternative embodiment of the control circuit. By sufficient dynamics of the microcontroller-internal analog-digital-converter AD3, the low frequency modulation component of the control signal of the monitor photodiode does not need to be decoupled from the direct component or separately amplified, and it is picked up, together with the direct component by the microcontroller μC The transmitter 10 contains, along with the laser diode 4 and the monitor photodiode, the laser diode driver 11 which is controlled directly by the microcontroller μC for regulating laser diode power. In the signal generation unit SEE both the phases φ1 and φ2 and the amplitudes A1 and A2 of the modulation signals I, Q are adjusted by phase adjustment means 21 configured as phase setters that are controllable external to the microcontroller μC, and by amplitude control means 22 configured as damping elements, respectively, wherein a ZF signal common to the two modulation signals I, Q having the intermediate frequency $f_{ZF}$ is generated, using an additional oscillator O.

Though the present invention was shown and described with references to the preferred embodiments, which are merely illustrative of the present invention and are not to be construed as a limtiation thereof and various modifications of the present invention will be apparent to those skilled in the art. It is, therefore, not intended that the present invention be limtied to the disclosed embodiments or details thereof, and the present invention includes all variations and or alternative embodiments within the spirit and scope of the present invention as defined by the appended claims.

What is claimed is:

1. A laser distance measuring device, comprising a laser diode (4) for emitting a high frequency, intensity modulated measurement light beam (3); a signal generation unit (SEE) for generating a high frequency signal, the laser diode (4) being connected with the signal generation unit (SEE) for high frequency signal transmission; at least one receiver photodiode (8a) for receiving the measurement light signal (3) reflected from a measurable object (5); a high frequency demodulator (13), the receiver photodiode (8a) being connected with the high frequency demodulator (13) for generating a low frequency phase-delay signal ($S_1$) for obtaining a phase information of the reflected, intensity-modulated, measurement light beam (3); and a microcontroller (μC) being connected with a control photo-detector (8c), which is arranged in a path of the measurement light beam (3), for providing a low frequency signal transmission, whereby an error signal transmission is effected by an unmixed control signal connected between said control photodetector and said microcontroller, and contains an error information minimized by error regulation of the modulation.

2. The laser distance measuring device according to claim 1, wherein the control photodetector (8c) is formed as a monitor photodiode integrated in a housing of the laser diode (4).

3. The laser distance measuring device according to claim 1 wherein the control photodetector (8c) the microcontroller (μC), the signal generating unit (SEE), the laser diode (4), and the measurement light beam (3) form a control circuit.

4. The laser distance measuring device according to claim 1, wherein the signal generating unit (SEE) is formed as a quadrature modulator, and wherein amplitude control means (22), which is controlled by the microcontroller (μC), is arranged between the microcontroller (μC) and the signal generating unit (SEE).

5. The laser distance measure device according to claim 4, further comprising phase control means (21) controlled by the microcontroller (μC) and arranged between the signal generating unit (SEE) and the microcontroller (μC).

6. The laser distance measuring device according to claim 4, wherein the amplitude control means is controlled relative to a direct component of modulation signals.

7. A distance measuring method, herein in a first step, a low frequency signal is generated, using which in a second step, a high frequency mixer signal (14) and a high frequency measurement signal (9) are produced in such a way that a low frequency mixed product between the high frequency mixer signal (14) and the high frequency measurement signal (9) is phase-locked relative to the low frequency signal generated in the first step, in a third step the high frequency measurement signal (9) is emitted by a laser diode (4) in form of a modulated measurement light beam (3) and is reflected by a measurement object (4) at a distance, in a fourth step, the reflected measurement light beam (3) is received temporally delayed by a receiver photodetector (8a) and the time-offset high frequency measurement signal (9) is demodulated by using a high frequency mixer signal (14), and in a fifth step, a phase delay signal (S1), which is produced by the demodulation of the time-offset high frequency measurement signal (9), is used by a microcontroller (μC) for calculating the distance (D), wherein in the third step at least the low frequency modulation component of the modulated measurement light beam (3) of the laser diode (4) detected using the control photodetector (8c) is presented to the microcontroller (μC) for value determination of an interference modulation component, whereby an error signal transmission is effected by an unmixed control signal connected between said control photodetector and said microcontroller, and contains an error information minimized by error regulation of the modulation.

8. The distance measuring method according to claim 7, wherein the third step retroacts upon the fist step via a feedback controlled by the microcontroller (μC).

9. The distance measuring method according to claim 7, wherein in the first step, two low frequency signals offset at 90° to each other are generated, which in the second step are quadrature modulated to the high frequency measurement signal (9) and the high frequency mixer signal (14).

10. The distance measuring method according to claim 8, wherein in the second step, at least one low frequency signal relative to at least one of amplitude and phase is regulated by the microcontroller (μC).

11. The distance measuring method according to claim 7, wherein in the first step, upon a write command, at least one current control parameter ($\phi_1, \phi_2, A_1, A_2$) of the feedback is written in a non-volatile memory, and wherein in response to a read command, the control parameter is initialized with that of the memory.

* * * * *

UNITED STATES PATENT AND TRADEMARK OFFICE
CERTIFICATE OF CORRECTION

PATENT NO. : 7,023,531 B2
APPLICATION NO. : 10/637997
DATED : April 4, 2006
INVENTOR(S) : Torsten Gogolla et al.

It is certified that error appears in the above-identified patent and that said Letters Patent is hereby corrected as shown below:

Title Page, Item (73) should read;
{73} Assignees:   Hilti Aktiengesellschaft, Schaan (LI)
                  Jenoptik Laser, Optik, Systeme GmbH, Jena (DE)

Signed and Sealed this

Sixth Day of March, 2007

JON W. DUDAS
*Director of the United States Patent and Trademark Office*